(12) United States Patent
Kobayashi et al.

(10) Patent No.: US 7,752,019 B2
(45) Date of Patent: **\*Jul. 6, 2010**

(54) STABILIZING SOLUTIONS TO OUTPUT FEEDBACK POLE PLACEMENT PROBLEM WITH PARAMETER DRIFT AND AUTOMATED ALERTING OF SYSTEM PARAMETER CHANGES

(75) Inventors: Mei Kobayashi, Kanagawa-ken (JP); Kaiyang Yang, Canberra (AU)

(73) Assignee: International Business Machines Corporation, Armonk, NY (US)

( \* ) Notice: Subject to any disclaimer, the term of this patent is extended or adjusted under 35 U.S.C. 154(b) by 0 days.

This patent is subject to a terminal disclaimer.

(21) Appl. No.: 12/176,401

(22) Filed: Jul. 20, 2008

(65) Prior Publication Data

US 2008/0275678 A1 Nov. 6, 2008

Related U.S. Application Data

(63) Continuation of application No. 11/113,631, filed on Apr. 24, 2005, now Pat. No. 7,502,722.

(51) Int. Cl.
*G06F 17/10* (2006.01)

(52) U.S. Cl. ............................................. 703/2; 700/28

(58) Field of Classification Search ..................... 703/2; 700/28
See application file for complete search history.

(56) References Cited

U.S. PATENT DOCUMENTS

2002/0156541 A1 10/2002 Yutkowitz

OTHER PUBLICATIONS

A. Varga, "A numerically reliable approach to robust pole assignment for descriptor systems", 2003, Future Generation Computer Systems, vol. 19, pp. 1221-1230.\*

(Continued)

*Primary Examiner*—Paul L Rodriguez
*Assistant Examiner*—Russ Guill
(74) *Attorney, Agent, or Firm*—Vazken Alexanian (57) ABSTRACT

Output feedback pole placement problems with parameter drift are solved with stabilizing solutions. Changes in system parameters trigger alerts in an automated manner. A representative method includes determining a set of solutions for an output feed pole placement problem, based on parameters of a physical system. The solutions are stable and well-conditioned for monitoring changes to the parameters of the physical system. The physical system is adjusted, or controlled, based on the solutions determined. Updated parameters of the physical system are acquired. A set of updated solutions for the output feedback pole placement problem are determined based on the updated parameters. The physical system is then adjusted, or controlled, based on the updated solutions determined. A system manager may also be notified of the updated parameters and/or the updated solutions. Furthermore, changes within the system may be monitored, and/or potentially critical changes within the system may be detected.

1 Claim, 6 Drawing Sheets

OTHER PUBLICATIONS

J. Lam et al., "Solution of robust pole-placement problem via gradient flow", 1994, Proceedings of the American Control Conference, pp. 2360-2364.*

Nicholas J. Higham et al., "The sensitivity of computational control problems", Feb. 2004, IEEE Control Systems Magazine, pp. 28-43.*

Volker Mehrmann et al., "Choosing Poles So That The Single-Input Pole Placement Problem Is Well Conditioned", 1998, SIAM Journal on Matrix Analysis and Applications, vol. 19, issue 3, pp. 1-20.*

Kaiyang Yang et al., "A projective algorithm for static output feedback stabilization," Proceedings of the $2^{nd}$ IFAC Symposium on System, Structure, and Control, Oaxaca, Mexico, 2004.

V. Blondel et al., "Survey on the state of systems and control," European Journal of Control, 1995 (also, Inria Report No. 2749, Jan. 1995).

James v. Burke et al., "A robust gradient sampling algorithm for nonsmooth, nonconvex optimization," SIAM Journal on Optimization, vol. 15, issue 3, pp. 751-779, Jun. 8, 2004.

Laurent El Ghaoui et al., "A cone complementarity linearization algorithm for static output-feedback and related problems," IEEE Transactions on Automatic Control, vol. 42, No. 8, 1997, pp. 1171-1176 (originally Oct. 18, 1996).

Kaiyang Yang et al., "Pole placement via output feedback: a methodology based on projections," in Proceedings of the $16^{th}$ IFAC World Congress, Prague, Czech Republic, 2005.

Frank Sottile, "The conjecture of Shapiro and Shapiro," http://www.math.univ-rennes1.fr/geomreel/raag01/surveys/shapiro/index.html, Apr. 17, 2000.

V.L. Syrmos et al., "Static output feedback: a survey," UNM Technical Report EECE95-008, Sep. 14, 1995 (also, Automatica, vol. 33, No. 2, pp. 125-137, year 1997).

Mauricio C. de Oliveira et al., "Numerical comparison of output feedback design methods." Proceedings of the American Control Conference, New Mexico, Jun. 1997, pp. 72-76, 1997.

A. Eremenko et al., "Pole placement by static output feedback for generic linear systems," SIAM Journal of Control and Optimization, vol. 41. No. 1, pp. 303-312, (2002).

Joachim: Rosenthal et al., "Some remarks on real and complex output feedback," System and Control Letters, vol. 33, pp. 73-80, 1998 (originally May 30, 1997).

Joachim Rosenthal et al., "Open problems in the area of pole placement," in V.D. Blondel et al., eds., "Open problems in mathematical systems and control theory," chapter 37, pp. 181-191, Springer Verlag, 1998.

Charles L. Lawson et al., Solving least square problems, first published 1974, currently published 1995, pp. 110-117.

Gene H. Golub et al., Matrix computations (second edition), copyright 1989, pp. 365-366.

Karl J. Astrom and Bjorn Wittenmark, "Adaptive Control", second edition, 1995, Addison Wesley Longman, pp. 1-5, 92, 331, 358, 366.

Philip E. Gill et al., "Practical Optimization", 1989, Academic Press, pp. 207-211.

Christos H. Papadimitriou and Kenneth Steiglitz, "Combinatorial Optimization: Algorithms and Complexity", 1982, Prentice-Hall, pp. 454-455.

Samuel H. Brooks, "A discussion of Random Methods for Seeking Maxima", 1958, Operations Research, vol. 6, No. 2, pp. 244-251.

David Kincaid and Ward Cheney, "Numerical Analysis Mathematics of Scientific Computing", 1991, Brooks/Cole Publishing Company, pp. 52, 161-167, 181-189.

* cited by examiner

| 702 → | 704 → | 706 → | 708 → | 710 → | 712 → | 714 → | 716 → | 718 → |
|---|---|---|---|---|---|---|---|---|
| t=0 | t=Dt | DS | t=2Dt | DS | t=3Dt | DS | t=4Dt | DS |
| $A_1$ | $A_1+DA_{11}$ | $DA_{11}$ | $A_1+DA_{11}$ | 0 | $A_1+DA_{11}+DA_{13}$ | $DA_{13}$ | $A_1+DA_{11}+DA_{13}$ | 0 |
| $B_1$ | $B_1$ | 0 | replace with $B_2$ | | | | | |
| $C_1$ | $C_1$ | 0 | $C_1+DC_{12}$ | $DC_{12}$ | $C_1+DC_{12}$ | 0 | $C_1+DC_{12}$ | 0 |
| | | | $B_2$ | | $B_2$ | | $B_2+DB_{24}$ | $DB_{24}$ |

700

STABILIZING SOLUTIONS TO OUTPUT FEEDBACK POLE PLACEMENT PROBLEM WITH PARAMETER DRIFT AND AUTOMATED ALERTING OF SYSTEM PARAMETER CHANGES

RELATED APPLICATIONS

The present patent application is a continuation of the previously filed patent application having the Ser. No. 11/113,631, filed Apr. 24, 2005, and which has issued as U.S. Pat. No. 7,502,722.

FIELD OF THE INVENTION

The present invention relates generally to solutions to the output feedback pole placement problem, and more particularly to such solutions that accommodate parameter drift, and automatically alert when changes in system parameters occur.

BACKGROUND OF THE INVENTION

Figure 1:
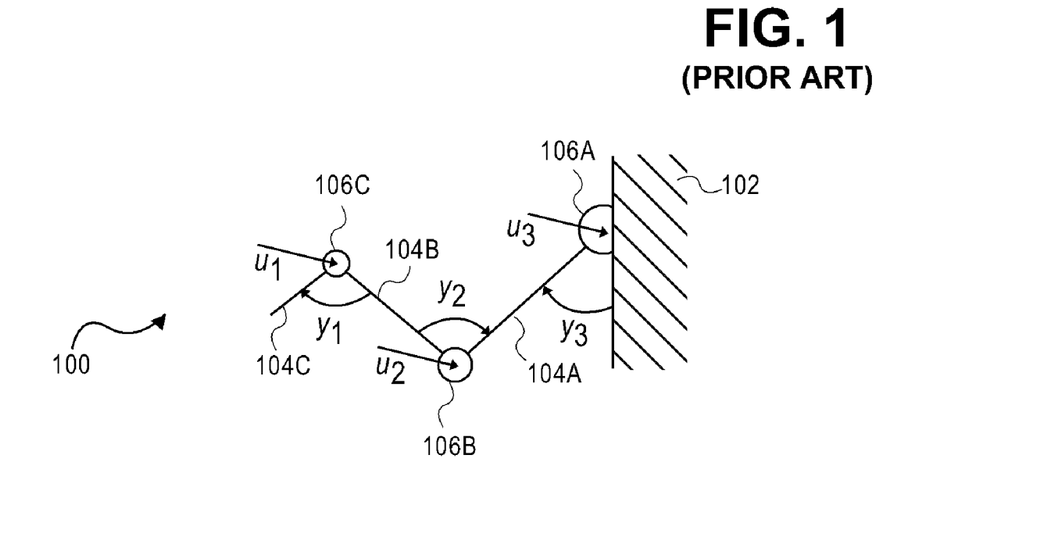
FIG. 1 is a diagram of an example representative physical system demonstrating a pole placement problem.

The output feedback pole placement problem occurs in physical systems, such as mechanical, scientific, engineering, geometrical, and biological systems. A representative example of such a system 100 is depicted in FIG. 1. In particular, there are mechanical linkages 104A, 104B, and 104C, collectively referred to as the mechanical linkages 104. The linkages 104 are connected to each other and to a surface 102, such as a wall, at points 106A, 106B, and 106C, collectively referred to as the joints 106, as depicted in FIG. 1. The linkages 104 may rotate around the joints 106 to which they are connected.

The mechanical linkages 104 are driven by torques $u_i$ applied to the joints 106 with measured angular displacements $y_i$. It may be desired to understand and control the behavior of this system 100. Setting $v_i$=ith angular velocity, the system 100 thus evolves according to the linearized Newton equations:

$$\frac{dv_i}{dt} = l_i u_i \qquad (1)$$

$$\frac{dy_i}{dt} = v_i \qquad (2)$$

More generally, a physical system can be considered as having m inputs and p outputs, which are modeled as vectors u in $R^m$ and y in $R^p$. If this system is linear, or is at near equilibrium, then there are n internal states x, which are considered as a vectors in $R^n$, such that the system is governed by first order linear evolution equations:

$$\frac{dx}{dt} = Ax + Bu \qquad (3)$$

$$y = Cx \qquad (4)$$

Figure 2:
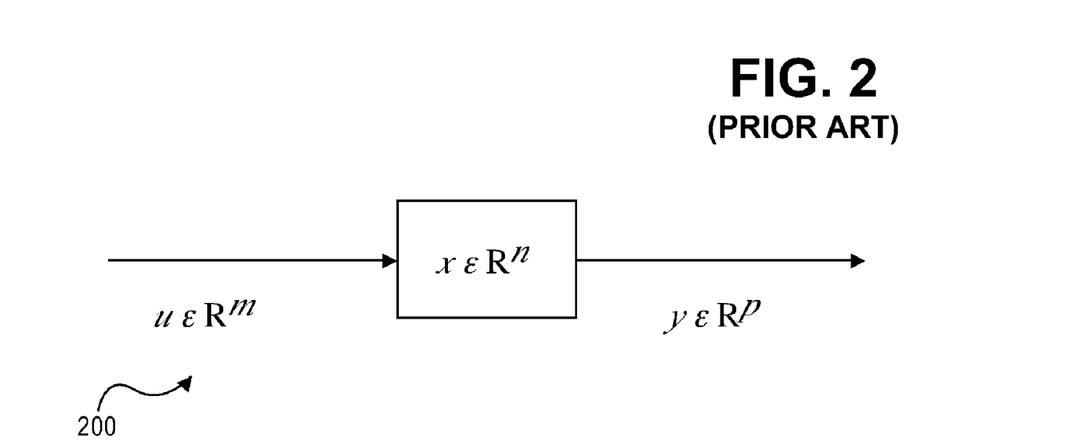
FIG. 2 is a diagram of a schematic representation of the physical system of FIG. 1.

FIG. 2 shows a schematic representation of such a physical system 200. The Fourier transform of equation (3) gives sx=Ax+Bu. If this is solved for x, and substituted in equation (4), the following result is obtained:

$$y = C(sI-A)^{-1} Bu \qquad (5)$$

The multiplier $C(sI-A)^{-1}B$ is called the transfer function of the system. This p by m matrix of rational functions determines the response of the measured quantities y in terms of the inputs u, in the frequency domain.

Figure 3:
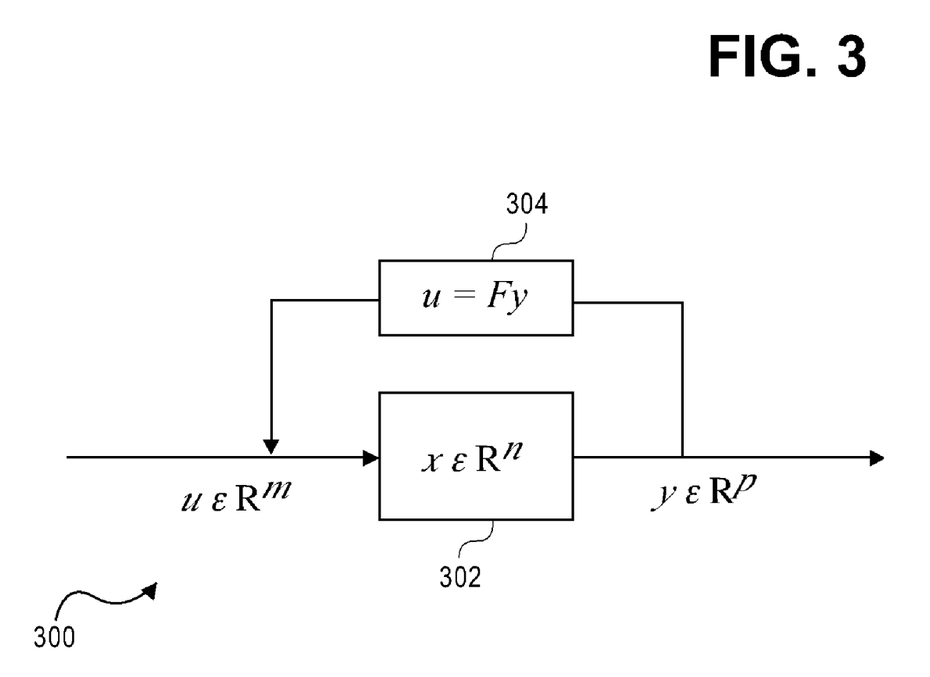
FIG. 3 is a diagram of a schematic representation of a feedback-control physical system, in conjunction with which and in relation to embodiments of the invention may be practiced.

Now, it is supposed that the system 200 is wished to be controlled with a constant linear output feedback u=Fy. Such a corresponding physical system 300 is depicted in FIG. 3. The behavior of the closed system $$\frac{dx}{dt} = (A + BFC)x \qquad (6)$$

is determined by the roots of the characteristic polynomial $$f(s) = det(sI_n - A - BFC) \qquad (7)$$

Thus, the forward problem is, given a physical system, represented as matrices A, B, C, and a feedback law F, then the system evolves according to the behavior encoded in its characteristic polynomial f(s). The inverse problem is the pole placement problem. That is, given a linear system represented by matrices A, B, C, and a desired behavior f(s), which feedback laws F satisfy $f(s)=det(sI_n-A-BFC)$?

The generalized static output feedback pole place problem can therefore be described as follows. Given real matrices $A \in R^{n \times n}$, $B \in R^{n \times m}$, $C \in R^{p \times n}$ and closed subsets $C_1, C_2, \ldots, C_n \subset C$, find $K \in R^{m \times p}$ such that $$\lambda_i(A+BKC) \in C_i \text{ for } i=1,2,\ldots,n \qquad (8)$$

Here, $\lambda_i(A+BKC)$ denotes the ith eigenvalues of A+BKC. Such eigenvalues can be considered the parameters of the physical system being analyzed and/or controlled.

There are various special cases of the generalized static output feedback pole placement problem. For instance, the classical pole placement problem can be written as $$C_i = \{c_i\}, c_i \in C \qquad (9)$$

The regions $C_i$ are discrete points. Stabilization-type problems for continuous time and discrete time physical systems can be written as $$C_1 = C_2 = \ldots = C_n = \{z \in C | Re(z) \leq -\alpha\} \qquad (10)$$

and $$C_1 = C_2 = \ldots = C_n = \{z \in C | |z| \leq \alpha\} \qquad (11)$$

respectively. The relaxed classical pole placement problem is written as $$C_1 = C_2 = \ldots = C_n = \{z \in C | |z - c_i| \leq r_i\} \qquad (12)$$

Furthermore, a final special case of the generalized static output feedback pole placement problem includes hybrid pole placement problems. These are problems that specify a pair of poles must be placed at a point and its complex conjugate, while all other belong within a closed region C. Thus, $$C_1 = \{c\}, C_2 = \{\bar{c}\}, C_3 = C_4 = \ldots C_n = C \qquad (13)$$

In variations of the hybrid pole placement problem, more than n pairs of points must be placed at a set of n points and their corresponding complex conjugates, while all others belong to a closed region C.

Solutions to these and other output feedback pole placement problems typically assume that the system parameters are constant. However, in many if not most real-world physical systems, the parameters are not perfectly constant. For example, everyday wear-and-tear on mechanical system parts can cause parameters to slowly drift from the original initial values.

The reference Kaiyang Yang and Robert Orsi, "Pole Placement via Output Feedback: A Methodology Based on Projections," in Proceedings of the 16th IFAC World Congress, Prague, Czech Republic, 2005, hereinafter referred to as [Yang and Orsi], discloses an algorithm for solving the generalized static output feedback pole placement problem described above in relation to equation (8). The algorithm of [Yang and Orsi], however, assumes that system parameters are perfectly constant or perfectly static. As a result, the algorithm cannot accommodate many real-world physical systems, in which such parameters are not perfectly constant.

Furthermore, the reference Kaiyang Yang, Robert Orsi, and John B. Moore, "A Projective Algorithm for Static Output Feedback Stabilization," in Proceedings of the 2nd IFAC Symposium on System, Structure and Control, Oaxaca, Mexico, 2004, hereinafter referred to as [Yang, Orsi, and Moore], a projective algorithm is proposed for the following static output feedback problem. Given a linear time invariant (LTI) system $$\frac{dx}{dt} = Ax + Bu \quad (14)$$

$$y = Cu \quad (15)$$

where the vectors $x \in R^n$, $u \in R^m$, $y \in R^p$, and the matrices $A \in R^{n \times n}$, $B \in R^{n \times m}$, $C \in R^{p \times n}$, find a static output feedback control law $$u = Ky \quad (16)$$

where $K \in R^{m \times p}$ is a constant matrix such that the eigenvalues $k_i$ of the resulting n-by-n close-loop system matrix A+BKC have non-positive real parts.

The projective algorithm of [Yang, Orsi, and Moore], like the algorithm of [Yang and Orsi] and other solutions to static output feedback problems, assumes that system parameters are perfectly constant or perfectly static. Because system parameters are typically not constant, however, the solutions provided by the projective algorithm of [Yang, Orsi, and Moore], [Yang and Orsi], and other solutions are not ideal. Furthermore, such solutions are often highly sensitive to small changes in the system parameters. Thus, even minor amounts of parameter drift can cause these solutions to no longer be appropriate and useful.

In addition, because the controllers in such physical systems often rely on solutions to the output feedback pole placement problem that are designed using initial system parameter values, they are not equipped to monitor drafts in system parameters over long periods of time. Furthermore, such controllers are not equipped to update the feedback control system to reflect these changes in the system parameters, nor alert the system manager when critical changes in the system parameters occur. For example, the controller in question may no longer be capable of accommodating the changes that have occurred over time. The net result is the system damage, or safety problems, can result.

For these and other reasons, there is a need for the present invention.

SUMMARY OF THE INVENTION

The present invention relates to a method to increase the stability of solutions to the generalized output feedback pole placement problem. Furthermore, the method can monitor changes in system parameters, update solutions to the generalized output feedback pole placement problem to reflect changes in system problems, and detect possibly critical changes in the system parameters so that the system manager can be notified in a timely manner.

In general, the present invention increases the stability of solutions to the almost generalized output feedback pole placement problem by using more than one solution when system parameters are almost, but not perfectly, constant. In one embodiment, enhancements to the solution to the generalized static output feedback pole placement problem proposed in [Yang and Orsi] are utilized. Furthermore, randomized sampling is utilized to select initial points for the iteration in the projective algorithm of [Yang, Orsi, and Moore], followed by testing to select solutions and iteration paths with attractive properties, such as stability to perturbations, noise and numerical round-off error, and that result in well-conditioned solutions. The computational results from previous time steps are used to reduce monitoring costs.

The enhancements to the solution proposed in [Yang and Orsi] are as follows. First, multiple solutions are determined, and just those solutions that are relatively stable to small perturbations are selected. Second, these solutions to the generalized static output feedback pole placement problem are monitored. Third, a system alerting mechanism is provided such that when one of the solutions can no longer be updated, a notification is provided to the system manager. Fourth, such solutions can be automatically replaced by a replacement solution, such as with the closest approximate solution, or the number of solutions can be reduced.

The present invention can thus be used be used to monitor changes in system parameters, update the system controller to reflect changes in system parameters over time, and detect possibly critical changes in the system parameters so that a system manager can be notified in a timely manner. As has been noted, the present invention can be initialized so that when one of the solution points reaches an alerting point, indicative, for instance, of a sudden large change, the system manager can be notified. The system may then subsequently automatically determine and replace the solution with a new solution, replace the solution with the closest approximate solution, or reduce the number of solutions used for monitoring system driver. The user may select which of these actions will occur, either before the system begins, or interactively.

A method of the invention thus determines a set of solutions for an output feedback pole placement problem, based on parameters of a physical system. The solutions are stable and well-conditioned for monitoring changes to the parameters of the physical system. The physical system is adjusted based on the solutions determined, such as by using a controller of the system. Updated parameters of the physical system are acquired, and a set of updated solutions for the output feedback pole placement problem are determined based on these updated parameters. The physical system is finally adjusted based on the updated solutions determined.

Still other aspects, embodiments, and advantages of the present invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

FIG. 3 shows a schematic representation of a feedback-control physical system 300, in conjunction with which and in relation to embodiments of the invention may be practiced. The physical system 300 includes a monitored component 302, representing the actual components of the physical system being monitored and that have physical parameters that can be adjusted. The physical system 300 also includes a monitoring or controller component 304. The component 304 is specifically a feedback component, that based on the results of the component 302, adjusts the parameters of the component 302 in a feedback manner.

The behavior of this closed system 300, as has been described, is $$\frac{dx}{dt} = (A + BFC)x \tag{17}$$

and which is determined by the roots of the characteristic polynomial $$f(s) = det(sI_n - A - BFC) \tag{18}$$

The pole placement problem for the system 300 is thus, given a linear system represented by matrices A, B, C, and a desired behavior f(s), what are the feedback laws that satisfy f(s)=det (sI$_n$-A-BFC), especially where the system parameters represented by the matrices A, B, C are not constant, and can change over time.

Figure 4:
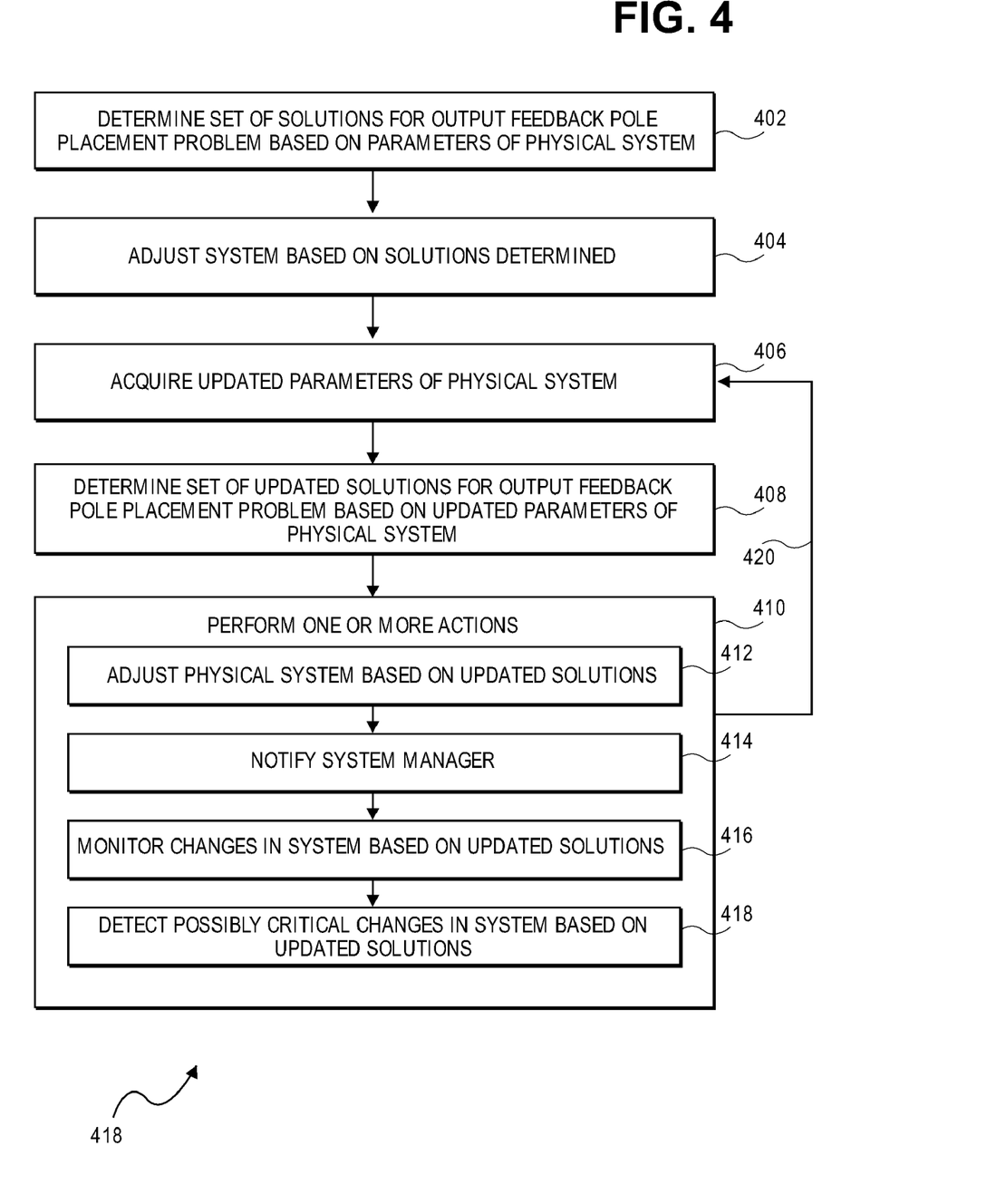
FIG. 4 is a flowchart of a method for updating solutions and monitoring drifts in the output feedback pole placement problem, according to an embodiment of the invention.

FIG. 4 shows a method 400 for updating solutions and monitoring drifts in the output feedback pole placement problem, according to an embodiment of the invention. There are eigenvalues k$_i$(A+BKC) of the n-by-n closed loop system matrix (A+BKC) that are specified. The method 400, like other methods of embodiments of the invention, can be implemented at least in part as one or more computer programs or computer program parts, stored on a computer-readable medium of an article of manufacture. The computer-readable medium may, for instance, be a recordable data storage medium or a modulated carrier signal.

Figure 5:
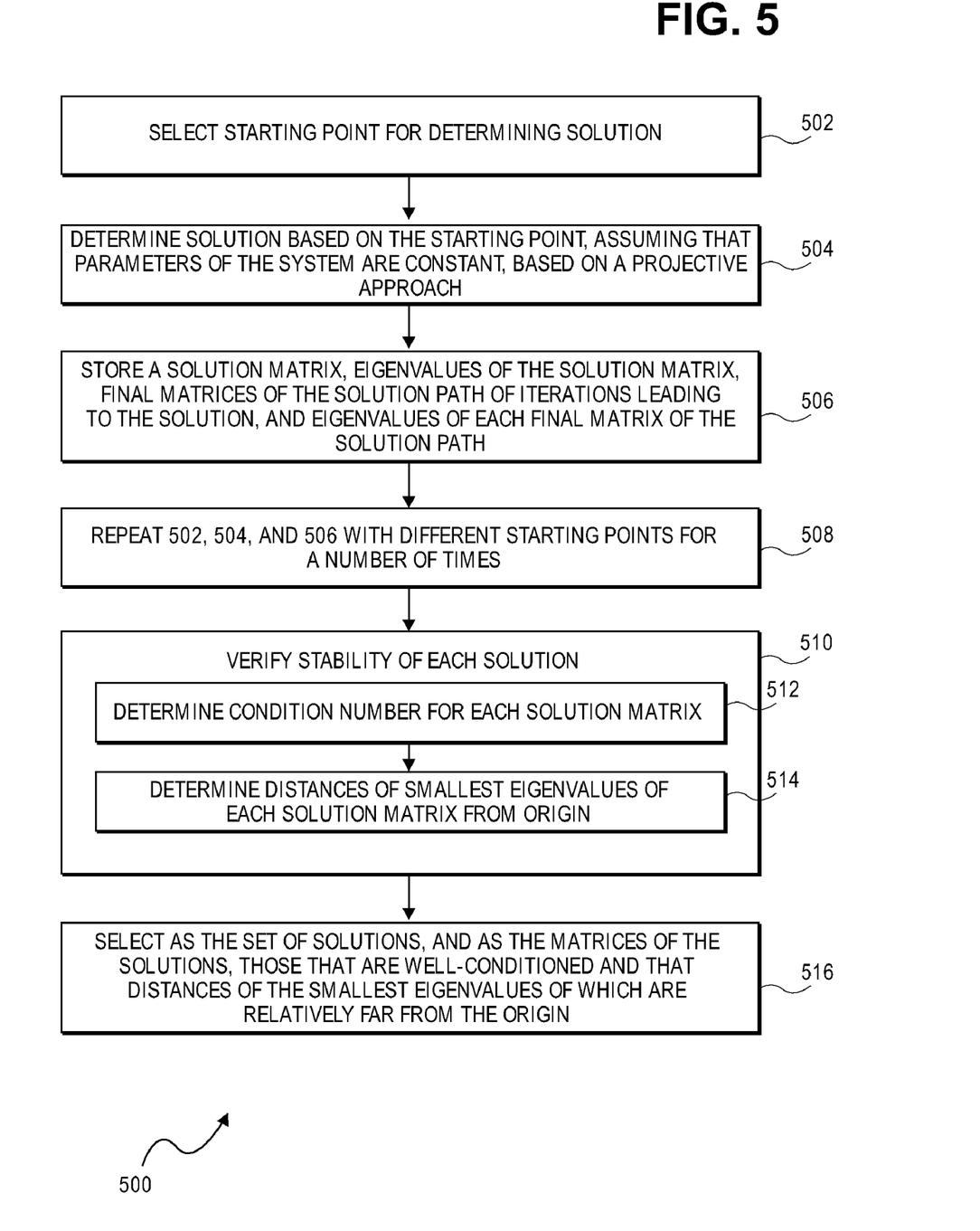
FIG. 5 is a flowchart of a method for determining a set of solutions for the output feedback pole placement problem that can be used in conjunction with the method of FIG. 4, according to an embodiment of the invention.

First, the method 400 determines a set of solutions for the output feedback pole placement problem based on parameters of a physical system (402). The output feedback pole placement problem may specifically be the classical, static-output feedback pole placement problem that has been described. FIG. 5 shows a method 500 for determining this set of solutions in 402, according to an embodiment of the invention.

First, at an initial time t=t$_0$, a starting point is selected for determining a solution based on the parameters of the physical system (502). The solution is then determined based on the starting point, with the assumption that the parameters of the system are constant, using the projective approach of [Yang and Orsi] and of [Yang, Orsi and Moore] (504). A number of values are stored for the solution, including the eigenvalues of the solution matrix, the final few matrices of the solution path of iterations that led to the solution, and the eigenvalues of each final matrix of the solution path (506). This process is repeated several times (508), with distinct, or different starting points for each solution. Therefore, as many distinct solutions to the classical output feedback pole placement are obtained as desired. The starting points may be randomly selected, or pseudo-randomly selected—for instance, as those starting points that are evenly or non-evenly spaced on a rectangular coordinate grid. Furthermore, the number of solutions that are determined can vary.

In one embodiment, a random matrix with the same eigenvalues k$_i$ as (A+BKC) is determined as follows. The given eigenvalues are placed along the diagonal of an upper triangular matrix, and randomly generated positive real numbers for the non-zero entries are placed above the diagonal. The upper triangular matrix is then multiplied by a randomly generated unitary matrix on the right-hand side, and its inverse on the left-hand side. This random matrix can then be used as the starting point to determine a solution with the projective approach of [Yang, Orsi, and Moore]. Other mechanisms for generating a random starting matrix that has a good chance of converging may also be used. This process is repeated a number of times, starting with distinct, or different, randomly generated initial matrices to obtain as many distinct solutions to the classical static output feedback pole problem as desired.

Furthermore, it is noted that the projective approach of [Yang and Orsi] and of [Yang, Orsi, and Moore] is based on computing a sequence of matrices, and their Schur decompositions, that converge to a solution. (In general, a Schur decomposition of the pair (A, B) is, if A and B are complex, A=QSZH and B=QTZH, where Q and Z are unitary and S and T are upper triangular.) The sequence of matrices can in principle be very long. However, empirical observations in numerical implementation studies of real-world problems suggest that the sequence normally consists of five to ten matrices, and the size of the matrices as at largest about fifty-by-fifty.

Sometimes a random starting point does not converge, or converges very slowly. In such cases, the iteration may be aborted, and another starting point selected, to begin a new iterative process to determine a solution.

Finally, it is noted that the computational cost of performing 502, 504, and 506 is small for small number of matrices that appear in output feedback pole placement problems. More specifically, the Schur decomposition of a real matrix includes two steps. First, the real matrix is converted to a matrix that is upper triagonal plus one lower diagonal band, using Householder transformations. The computational cost is approximately $$\frac{14n^3}{3}$$

flops, where approximately $$\frac{10n^3}{3}$$

flops are required or the converted matrix and approximately $$\frac{4n^3}{3}$$

flops are required for the explicit computation of the unitary transformation. Second, the real matrix is converted to upper triangular form using Householder reflections in a process known within the art as chasing or zero chasing. The computation cost is $O(n^2)$ flops.

Still referring to FIG. 5, the next step or act is to verify the stability of each of the solutions that was determined (510). That is, the stability of the matrices within the solution path during the iterative computations and that converge to a solution is verified. In one embodiment, this is accomplished as follows. First, the condition number for each solution matrix is determined (512). The condition numbers indicate the stability of the matrices under perturbations. The condition number in the matrix L2-norm is the ratio of the smallest and largest eigenvalues. Next, the distances of the smallest few eigenvalues of each of the solution matrices from the origin are determined (514). These distances indicate whether a given matrix has a likelihood of changing in the near future.

Thus, the set of solutions (and their matrices) are selected as the solutions that are well-conditioned and that have distances of the smallest eigenvalues of which being relatively far from the origin (516). Well-conditioned solutions are solutions having solution matrices that have relatively large condition numbers, indicating that these solutions are stable under perturbations, and thus in response to changes in the system parameters. That is, such solutions are more stable, and less sensitive to noise and numerical round-off errors. Solutions that have eigenvalues with distances that are relatively far from the origin indicate that such solutions are less likely to change in the near future. Therefore, well-conditioned solutions with very large eigenvalues, in terms of their distances from the origin, are less likely to undergo a change in matrix rank, which can be a critical change point, when the system parameters are undergoing slow drift. A change in matrix rank occurs when one of the eigenvalues of a matrix with temporally dependent entries approaches zero.

Furthermore, in one embodiment, the condition number may be multiplied by a constant factor. Alternatively, different types of matrix norms may be used in the definition of the condition number, as can be appreciated by those of ordinary skill within the art.

Referring back to FIG. 4, after the set of solutions is determined, the controller or other component may adjust the physical system being monitored and controlled based on the solutions determined (404). For instance, in relation to FIG. 3, the controller component 304 may provide feedback to the component 302 that is being monitored or controlled to adjust the component 302, or have the component 302 adjusted. The controller further acquires updated parameters regarding the physical system (406). For instance, in relation to FIG. 3, the controller component 304 may then monitor the component 302 to determine whether any parameters have changed.

In one embodiment, the system parameters are measured at equally spaced time intervals Dt. Alternatively, the time intervals used for monitoring the system parameters may be unevenly spaced. As can be appreciated by those of ordinary skill within the art, there are many different ways to interpolate changes in the solutions to understand the drift of the parameters. For purposes of description, it is presumed that the system parameters are acquired at homogenously spaced time intervals, although non-homogenously spaced time intervals can also be employed. In particular, after each time $t_{x+1}=t_x+Dt$, the system parameters are acquired.

Figure 6:
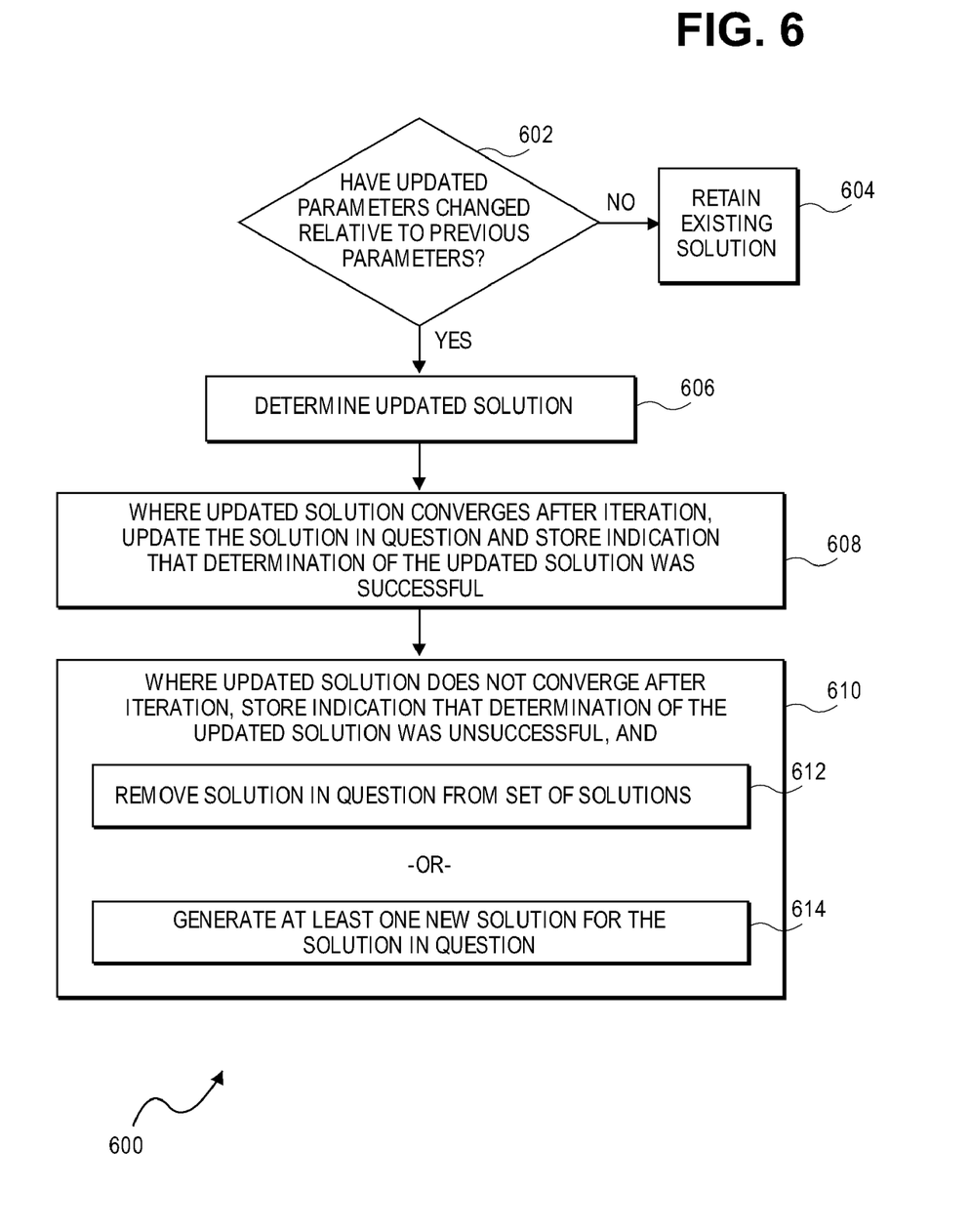
FIG. 6 is a flowchart of a method for updating a solution for the output feedback pole placement problem that can be used in conjunction with the method of FIG. 4, according to an embodiment of the invention.

Each time the system parameters are measured, a set of updated solutions for the output feedback pole placement problem is determined based thereon (408). More particularly, each solution that was previously determined is updated based on the new system parameters. FIG. 6 shows a method 600 that can be used for each solution when new system parameters are measured, according to an embodiment of the invention, to accomplish 408 of the method 400 of FIG. 4. That is, the method 600 is performed for each solution that was previously determined, when the system parameters are updated.

First, if the updated parameters have not changed relative to the previous parameters for the system (602), then the solution in question is retained (604) without having to update the solution. That is, the updated solution is equal to the preexisting solution previously determined. However, if the updated parameters have changed relative to the previous parameters (602), then the method 600 determines an updated solution relative to the new parameters. This updated solution is determined as has been described in relation to FIG. 4, using the same starting point as the corresponding existing solution in question, or a starting point that is close to the existing solution in question, along the existing solution's original convergence path. Thus, an updated solution to the classical output feedback pole placement problem is determined using the projective approach of [Yang, Orsi, and Moore], as enhanced as has been described in relation to FIG. 4.

There are two possible outcomes upon determining the updated solution for the existing solution in question. First, the updated solution may converge after iteration. In this instance, the existing solution in question is stored for archival purposes, and further it is recorded that determination of an updated solution was successful (608). Furthermore, the existing solution in question is replaced with the updated solution that has been determined. In this way, the existing solution is updated in light of changing system parameters.

Second, however, the updated solution may not converge after iteration. In this instance, the existing solution in question is again stored for archival purposes, and further it is recorded that determination of an updated solution was unsuccessful (610). Furthermore, one of two other acts or steps is performed. First, the existing solution in question may simply be removed from the set of solutions for the classical output feedback pole placement problem (612), since this solution is no longer relevant for the updated system parameters. Second, the existing solution in question may be replaced with one or more completely new solutions (614). These completely new solutions are generated using different starting points than the existing solution and the updated solution that did not converge. The different starting points may be randomly selected in one embodiment of the invention, and their corresponding completely new solutions are determined using the projective approach of [Yang, Orsi, and Moore], as enhanced as has been described in relation to FIG. 4.

It is noted that whether a solution is removed or replaced with one or more completely new solutions when the updated solution does not converge after iteration may be selected by the system manager before the system begins running. Alternatively, each time an updated solution does not converge after iteration, the system manager may be able to decide whether the existing solution in question should be removed or replaced with one or more completely new solutions. Finally, it is noted that each time an updated solution does not converge, in one embodiment, after a number of such failed solutions in a given period of time, or if the percentage of solutions that have failed in the given period of time is greater than a predetermined threshold, a system manager is alerted.

Referring back to FIG. 4, it is noted that 408 is performed, such as has been described in relation to the method 500 of FIG. 5, for each solution at each time interval in which the system parameters are measured. Not depicted in FIG. 4 is that this process ends when the user, such as the system manager, stops the system, or until no solutions, and thus no approximate solutions, to the almost-static, classical output feedback pole placement problems are active. For example, all of the existing solutions may have been removed from the set of solutions, and/or there may be no viable completely new solutions to replace the existing solutions.

Furthermore, each time the set of solutions is updated in 408—that is, after each time interval in which the system parameters are measured or updated—410 is performed. Thus, the method 400 acquires the updated parameters in 406, determines the set of updated solutions in 408, and then performs one or more actions in 410. This process is repeated, as indicated by the arrow 420, until the user stops the system, or until no solutions remain active, as has been described in the previous paragraph. Therefore, what is described next are the various actions that can be performed in 410 after the updated set of solutions has been determined for a given time interval's updated measured system parameters in 408.

First, the physical system may be adjusted based on the updated solutions (412). For instance, in relation to FIG. 3, the controller component 304 may provide feedback to the component 302 that is being monitored or controlled to adjust the component 302, or have the component 302 adjusted. Second, the system manager may be notified (414). The system manager may be notified in one embodiment only when certain critical changes in the system parameters occur, or may be notified at each time interval during which updated changed parameters have been measured. Third, and related to notification of the system manager, is that changes in the system, based on the updated solutions, may be monitored (416). Also related is fourth, that possibly critical changes in the system are detected, based on the updated solutions (418). These actions are now described in sum, even though they have been divided into separate actions in the method 400 of FIG. 4.

Figure 7:
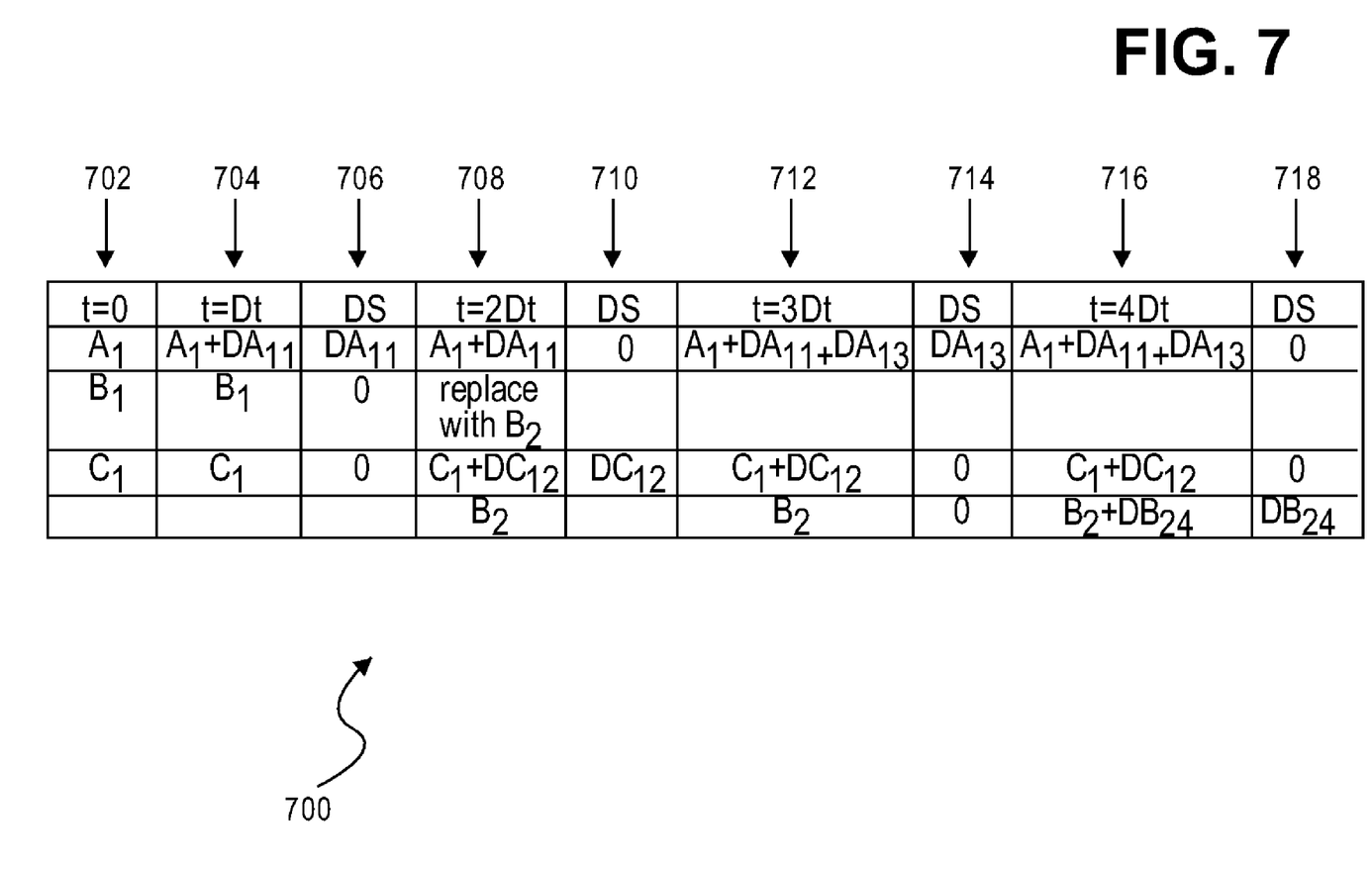
FIG. 7 is a diagram of a chart that can be used to monitor the physical system and for notifying or alerting the system manager when possibly critical changes in system parameters have occurred, according to an embodiment of the invention.

For example, the updated solutions can be used to construct a chart or an equivalent for monitoring the system. FIG. 7 shows an example representative chart 700 that can be constructed and displayed as a part of monitoring the physical system and notifying the system manager, according to an embodiment of the invention. As indicated in the column 702, at time t=0, the initial set of solutions determined include the solution matrices $A_1$, $B_1$, and $C_1$. As indicated in the column 704, at the time t=Dt, the solution matrix $A_1$ has been modified as the updated solution matrix $A_1+DA_{11}$, whereas the solution matrices $B_1$ and $C_1$ remain the same. The column 706 indicates the delta or change in the solution matrices between the time t=0 and the time t=Dt. Thus, the change in the first solution matrix is $DA_{11}$, whereas there is no change in the other two solution matrices.

As indicated in the column 708, at the time t=2Dt, the solution matrix $A_1+DA_{11}$ remains the same. The solution matrix $B_1$, however, has been replaced with the completely new solution matrix $B_2$. The solution matrix $C_1$ has been modified as the updated solution matrix $C_1+DC_{12}$. The column 710 indicates the delta or change in the solution matrices between the time t=Dt and the time t=2Dt. There is no change in the first solution matrix $A_1+DA_{11}$, while the replacement of the solution matrix $B_1$ with the completely new solution matrix $B_2$ renders this delta or change inapplicable. Finally, the third solution matrix has changed by $DC_{12}$.

As indicated in the column 712, at the time t=3Dt, the solution matrix $A_1+DA_{11}$ has been modified as the updated solution matrix $A_1+DA_{11}+DA_{13}$. The solution matrix $C_1+DC_{12}$ and the solution matrix $B_2$ have remained the same. The column 714 indicates the delta or change in the solution matrices between the time t=2Dt and the time t=3Dt. There is a change to the first solution matrix by $DA_{13}$, whereas the second and third solution matrices have not changed.

As indicated in the column 716, at the time t=4Dt, the solution matrix $A_1+DA_{11}+DA_{13}$ has not changed, and the solution matrix $C_1+DC_{12}$ has not changed. However, the solution matrix $B_2$ has been modified as the updated solution matrix $B_2+DB_{24}$. The column 718 indicates the delta or change in the solution matrices between the time t=3Dt and the time t=4Dt. There is a change only to the third solution matrix, by $DB_{24}$, such that the first and the second solution matrices have not changed.

Thus, information on each of the solutions may include parameters that are inexpensive to determine. These parameters can include changes in the largest eigenvalues, changes in the smallest eigenvalues, changes in the matrix condition numbers, changes in the matrix Frobenius norm, and changes in the slopes of the graphs of these changes, such as the discretized accelerations of the parameters. Furthermore, in one embodiment, the number of solutions that become obsolete during each time interval as well as over extended time intervals is tracked and displayed to the system manager as desired.

Changes in the number of solutions that become absolute as well as the discretized acceleration of the number of solutions that become obsolete can be used to identify possibly suspicious or unusually high numbers of solution failures. Such unusually high failures may indicate that a significant shift in the system has taken place, such that an alert may be automatically sent to the system manager. In addition, a gradual or constant acceleration of the number of failures over more than a short period of time may be an indication of system parts fatigue, so that an alert may also be automatically sent to the system manager in this situation.

The method 400 has been described in relation to solving a classical output feedback pole placement problem. Furthermore, the method 400 can also be extended to solve the generalized output feedback pole placement problem. For instance, eigenvalues within the interior of closed regions may be selected, such as random, when generating the initial starting point matrices. Furthermore, if any of the regions is very close to zero, then the eigenvalues that are as large as possible and away from the origin are selected (and either as close to possible to the sizes of the other eigenvalues selected, or to one).

Thus, it is noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of embodiments of the present invention. Therefore, it is manifestly intended that this invention be limited only by the claims and equivalents thereof.

We claim:

1. A method comprising:
   determining a set of solutions for a classical, static-output feedback pole placement problem based on parameters of a physical system using a projective approach and random starting points for the solutions, and including performing iterative testing to select the solutions and iterative paths of the solutions having properties that satisfy a criteria;
   adjusting the physical system based on the solutions determined;
   acquiring updated parameters of the physical system;
   determining a set of updated solutions for the classical, static-output output feedback pole placement problem based on the updated parameters of the physical system, including using the solutions previously determined; and,
   performing one or more of:
      adjusting the physical system based on the updated solutions determined;
      notifying system manager of updated solutions or updated parameters;
      monitoring changes in the physical system based on the updated solutions determined; and,
      detecting potentially critical changes in the physical system based on the updated solutions determined,
   wherein determining the set of solutions comprises determining the set of solutions for a generalized output feedback pole placement problem based on the parameters of the physical system by:
      a) selecting a starting point for determining a solution based on the parameters of the physical system;
      b) determining the solution based on the starting point, assuming that the parameters are constant, based on a projective approach;
      c) storing for the solution, a solution matrix, eigenvalues of the solution matrix, one or more final matrices of a solution path of iterations leading to the solution, and eigenvalues of each final matrix of the solution path of the iterations leading to the solution; and,
      d) repeating a), b), and c) with different starting points for a number of times, such that the set of solutions are distinct;
      e) verifying stability of each solution by:
         determining a condition number for the solution matrix for the solution;
         determining distances of one or more smallest of the eigenvalues of the solution matrix from an origin; and,
      f) selecting the set of solutions and matrices of the solutions that are well-conditioned in that the set of solutions are stable under perturbations, and such that the one or more smallest of the eigenvalues of the matrices have distances from an origin such that the solutions corresponding to the matrices having the one or more smallest of the eigenvalues have a likelihood of undergoing a change in matrix rank that is below a threshold.

* * * * *